(No Model.)

J. B. SWEETLAND.
FLOUR AND MEAL BIN AND SIFTER.

No. 395,639. Patented Jan. 1, 1889.

Witnesses:
John T. Finch Jr.
C. D. Davis

Inventor:
Jerome B. Sweetland
By C. M. Alexander
Att'y.

United States Patent Office.

JEROME B. SWEETLAND, OF PONTIAC, MICHIGAN, ASSIGNOR TO ENOCH M. BEEBE, OF HURON, DAKOTA TERRITORY.

FLOUR AND MEAL BIN AND SIFTER.

SPECIFICATION forming part of Letters Patent No. 395,639, dated January 1, 1889.

Application filed December 29, 1887. Serial No. 259,334. (No model.)

*To all whom it may concern:*

Be it known that I, JEROME B. SWEETLAND, a citizen of the United States, residing at Pontiac, in the county of Oakland and State of Michigan, have invented certain new and useful Improvements in Flour and Meal Bins and Sifters, of which the following is a specification, reference being had therein to the accompanying drawings.

This invention relates to certain novel and valuable improvements in flour and meal bins and sifters, the essential features of which consist in improvements on the flour and meal sifting device, which will be fully understood from the following description and claims, taken in connection with the annexed drawings, in which—

Figure 1:
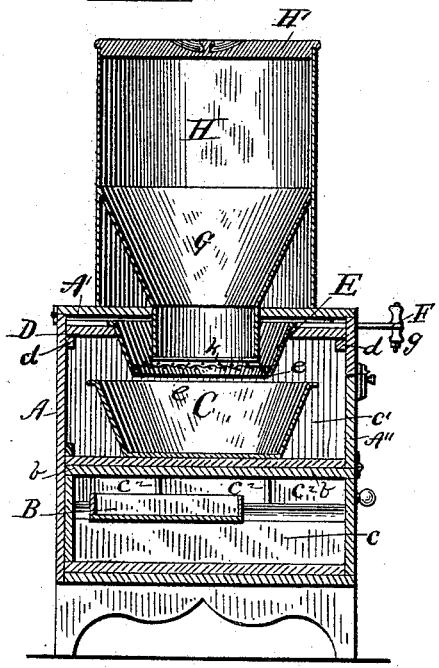
Figure 2:
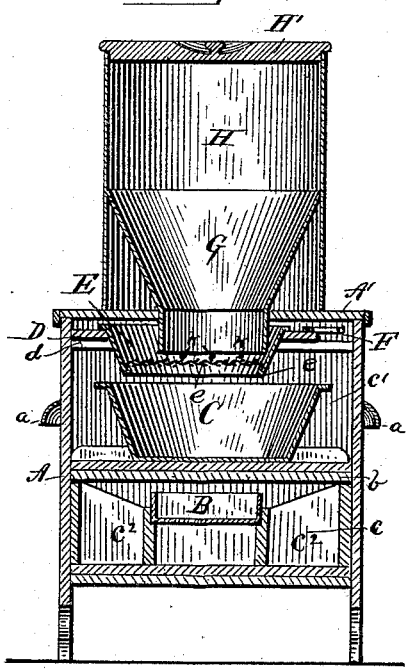
Figure 3:
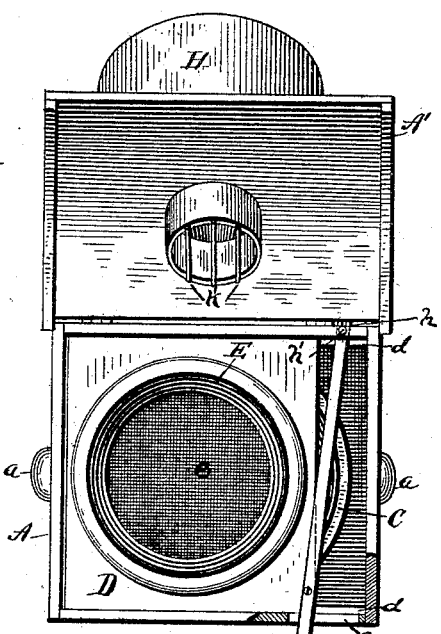
Figure 4:
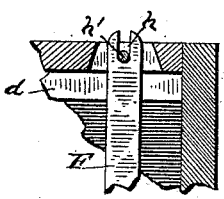

Figure 1 is a vertical central section through my improved cabinet, taken from front to rear thereof. Fig. 2 is a vertical central section through the cabinet, taken in a plane at right angles to the plane of Fig. 1. Fig. 3 is a top view of the body of the cabinet, the cover thereof being turned back to expose the lower extremity of the discharge-funnel and the agitating-bars applied thereto. Fig. 4 is a sectional detail, somewhat enlarged, showing the notched end of the agitating hand-lever applied to its fixed stud to allow free vibration of this lever.

Referring to the annexed drawings by letter, A designates the rectangular body of the cabinet, which is provided with handles a a, by which it can be conveniently moved from one place to another. This cabinet-body is divided by a horizontal partition, b, into two compartments, c c'. The lower compartment, c, contains a drawer which is subdivided into two rows of bins, $c^2$, adapted to contain spices, &c., and between these bins is a longitudinal receptacle, the side walls of which have horizontal shoulders for supporting a removable knife-box, B, which is shorter than the length of the drawer and can be moved endwise therein.

In the upper compartment, c', is placed a removable pan, C, designed to receive the flour during the sifting operation. This pan may be of the well-known kind, and it is preferably of sufficient size to nearly fill the area of the compartment c', from which it can be conveniently removed. Near the upper edge of the compartment c', and rigidly secured to the inner sides of the front and rear walls thereof, are two horizontal strips, d d, upon which is free to slide a board, D, provided with a large circular opening. In this opening is applied a downwardly-tapered pan, E, having a reticulated bottom, e, and provided with a flange which supports this pan upon the sliding board D. This pan or sifter E is arranged immediately above the receiving-pan C, so that the fine or sifted flour will be received therein.

To the right-hand front corner of the sliding board D, I pivot a horizontal hand-lever, F, the front end of which projects forward through a slot, f, made through the front wall of the cabinet, and is provided with swivel-handles g. The rear end of this lever F is notched at h, and receives through this a stud, h', which is fixed into the rear wall of the cabinet, as clearly shown in Fig. 4. By means of this lever a person can conveniently reciprocate the sliding board D with its sifting-pan, and there will be no binding of either the said board or lever.

A' designates a closely-fitting cover which is hinged to the upper edge of the back wall of the cabinet, and constructed with a circular aperture through it, through which passes the cylindrical discharging-neck of a funnel, G, the upper edge of which is suitably secured to a cylindrical tank, H, mounted upon and rigidly secured to the cover A', and provided with a removable cover, H'. The upper edge of the funnel G is flush with the inner surface of the tank H, so that there will be no lodgment of flour at this point.

Across the lower end of the neck of funnel G are a number of parallel rods, K, extending from front to rear and designed to serve as breakers, rubbers, and pulverizers. These bars are in close relation to the sieve-bottom of the pan E when the cover is down, as shown in Figs. 1 and 2, and they serve to prevent the meshes of the sieve from clogging, as well as to reduce the lumps of flour during the sifting operation.

In operation the flour to be sifted is put into the tank H and this tank covered. The pan C, being in place beneath the sifter, and a hinged door, A², of compartment c' closed and latched, a person grasps the handles of lever F, and by vibrating it gives a reciprocating movement to the sifting-pan, into which the flour from the tank and its funnel descends as rapidly as the sifted flour passes through the sieve-pan bottom into the receiving-pan C. When the tank is emptied, the cover A' is turned back, as shown in Fig. 3, when the sifter can be removed and cleansed of foreign matters which were mixed with the flour.

Having thus fully described my invention, what I claim as new, and desire to secure by Letters Patent, is—

The combination of the body of the cabinet A, provided with a hinged cover, A', a funnel, G, the neck of which is inserted in a central aperture in the said cover, the parallel rubbing-bars K, secured to the lower end of the said funnel, the reciprocating board D, mounted on ways immediately below the cover of the cabinet, a lever, F, pivotally attached to the board D, for operating it, the pan E, inserted in an opening in the said reciprocating board D, this pan being provided with a reticulated bottom, e, the neck of the said funnel G being somewhat smaller in diameter than the pan E and extending down into the same in close proximity to the reticulated bottom e, whereby the rubbing-bars K upon the lower end of the neck of the funnel will disintegrate and force the flour through the said reticulated botttom e, substantially as herein set forth.

In testimony whereof I affix my signature in presence of two witnesses.

JEROME B. SWEETLAND.

Witnesses:
JUNIUS TEN EYCK,
ABRAM W. LE ROY.